US005555676A

United States Patent [19]
Lund

[11] Patent Number: 5,555,676
[45] Date of Patent: Sep. 17, 1996

[54] VERTICAL PLANTER APPARATUS AND METHOD

[75] Inventor: John F. Lund, Salt Lake City, Utah

[73] Assignee: A.C.T., Inc., Salt Lake City, Utah

[21] Appl. No.: 333,629

[22] Filed: Nov. 3, 1994

[51] Int. Cl.$^6$ .................................................. A01G 25/00
[52] U.S. Cl. ................................................... 47/82; 47/83
[58] Field of Search ........................................... 47/82, 83

[56] References Cited

U.S. PATENT DOCUMENTS

| | | | |
|---|---|---|---|
| 2,152,869 | 4/1939 | Campbell | 47/82 |
| 3,252,252 | 5/1966 | Muelberger, Jr. | 47/82 |
| 3,892,982 | 7/1975 | Holmes | 47/62 |
| 4,033,072 | 7/1977 | Kobayashi et al. | 47/83 |
| 4,756,120 | 7/1988 | Arledge | 47/82 |
| 4,937,969 | 7/1990 | Kawabe et al. | 47/62 |
| 4,986,027 | 1/1991 | Harvey | 47/82 |
| 5,031,359 | 7/1991 | Moffett, Jr. | 47/82 |
| 5,265,376 | 11/1993 | Less | 47/83 |
| 5,276,997 | 1/1994 | Swearengin et al. | 47/82 |
| 5,287,652 | 2/1994 | Delp | 47/62 |
| 5,363,594 | 11/1994 | Davis | 47/82 |

FOREIGN PATENT DOCUMENTS

| | | | |
|---|---|---|---|
| 3639778 | 11/1979 | Australia | 47/83 |
| 0098474 | 1/1984 | European Pat. Off. | 47/82 |
| 231444 | 6/1944 | Switzerland | 47/83 |
| 1678252 | 9/1991 | U.S.S.R. | 47/82 |
| 2222063 | 2/1990 | United Kingdom | 47/83 |

Primary Examiner—Terry Lee Melius
Assistant Examiner—Joanne C. Downs
Attorney, Agent, or Firm—J. Winslow Young

[57] ABSTRACT

A vertical planter for supporting a plurality of plants vertically. The planter includes a hollow column mounted vertically on a water reservoir. The hollow column is fabricated from one or more column modules which are filled with a planting medium. A plurality of planting ports are formed in the wall of the hollow column to provide access for plants to be planted in the planting medium. Planter inserts can also be attached to the planting ports, the planter inserts supporting a body of the planting medium on the external surface of the hollow column. A water distribution system is provided for delivering water to the planting medium and includes a secondary reservoir with a distribution line distributing the water into the planting medium. Moisture sensors and an optional timer drive a pump to deliver the water from the water reservoir into the water distribution system.

10 Claims, 3 Drawing Sheets

VERTICAL PLANTER APPARATUS AND METHOD

BACKGROUND

1. Field of the Invention

This invention relates to gardening and, more particularly, to a novel vertical planter apparatus and method whereby the planting medium for a plurality of plants is contained in a modular, vertical column having side ports and optional planting cups into which the plants are planted.

2. Related Patents Owned By Assignee

This invention is owned in common with U.S. Pat. No. 5,363,594 issue date 15 November 1994 for VERTICAL GARDENS by Kenneth Wesley Davis by reason of an assignment recorded in the United States Patent and Trademark Office on 7 November 1991 at Reel 5911 Frames 0951 to 0953.

3. The Prior Art

The practice of gardening is the most popular leisure time activity in all of the industrialized nations of the world. Gardening is enjoyed by all ages from the very young to the very old. Gardening is not only excellent exercise and a valuable source of fresh produce, but studies have shown that gardening significantly reduces stress, relieves boredom, and, in general, improves the overall physical and emotional well being of the person involved in gardening. Leisure-time gardens range in type from specialty indoor gardens for exotic flowers to large outside plots used for growing flowers as well as edible produce such as herbs, fruits, vegetables, and grains. Any garden intended for growing plants, regardless of type or location, requires a planting medium, sufficient light, and water, as well as the addition of plant nutrients from time to time depending upon the type of garden and the nature and type of plants.

Historically, gardens were planted in orderly rows, the rows being spaced sufficiently far apart to prevent crowding, accommodate mechanical weeding, and, where necessary, the administration of water through irrigation. Until the past few decades it has been possible to allocate a relatively large area of a yard to the exclusive use of a garden so that the economical use of space was not a problem. However, with the burgeoning population throughout the world, the available space for a garden is becoming more and more of a premium. Further, persons living in apartments have been essentially excluded from the beneficial enjoyment of the hobby of gardening.

Various planter systems have been proposed for the purpose of enabling a person to enjoy the benefits of a garden in the absence of sufficient space or even direct access to the soil. For example, Carlyon, Jr. (U.S. Pat. No. 3,841,023) discloses a display apparatus for potted plants. The display apparatus includes a vertical stack of trays spaced one above the other, each tray including a water inlet and an overflow drain.

Moffett, Jr. (U.S. Pat. No. 4,065,876) discloses a portable garden fabricated from a vertical cylinder of wire mesh, the wire mesh supporting a bag of soil into which the root ball of each individual plant is inserted.

Leroux (U.S. Pat. No. 4,218,847) discloses a hydroponic apparatus having a free standing base housing, a water-based nutrient feed supply, and a plurality of mutually supporting plant trays oriented in a vertical array. A timer is used to control the pump for the nutrient feed supply.

Karpisek (U.S. Pat. No. 4,380,136) discloses an assembly kit for a plurality of holders for a growth medium. At least two vertical bracket supports are used to adjustably support the holders against a vertical wall.

Harvey (U.S. Pat. No. 4,986,027) discloses a hydroponic growth system wherein a flexible tubular element is suspended from an overhead support. The tubular element contains a root permeable material with slits formed in the sidewall. A reservoir at the base of the tubular element holds a fluid nutrient, and a pump is used to circulate the fluid nutrient to the permeable material for uptake by the roots.

Garden (U.S. Pat. No. 4,920,695) discloses a container system for growing plants. A container holds a growing medium and has one or more flat but flexible wall panels. The panels have openings through which plants can be grown.

Moffett, Jr. (U.S. Pat. No. 5,031,359) discloses a vertically oriented garden structure having an elongated enclosure for holding a growing medium. The enclosure has a central, hollow body member of a uniform cross-sectional area and peripheral shape. A plurality of openings provide access to the planting medium supported by the enclosure.

Howgill (U.K. Patent No. 1,486,553) discloses a vertical garden having a hollow body tube with indentations at certain areas. Cup-shaped hoods are inverted into the planting material in the hollow body to keep the planting material from entering the outlet apertures.

Howgill et al (U.K. Patent Application 2,070,403) discloses a hanging plant cultivation container having a series of pockets in the sidewall of the container, the pockets receiving plants planted therein.

Casadio (European Patent Application 0,301,362) discloses a vertical plant holder having a vertical, tubular body and plurality of cups mounted thereto. A water system directs water to each cup. Each cup is adapted to contain a plant.

In view of the foregoing it would be an advancement in the art to provide an improved vertical garden apparatus and method for growing plants in the vertical orientation. Another advancement in the art would be to provide a vertical planter system constructed from modular elements. It would also be an advancement in the art to provide a vertical garden with an automated watering system controlled by at least one moisture sensor in the planting medium. An even further advancement in the art would be to provide a vertical garden with detachable, externally oriented planting cups that allow the plant to be planted in its normal, upright orientation. Such a novel apparatus and method is disclosed and claimed herein.

BRIEF SUMMARY AND OBJECTS OF THE INVENTION

This invention is a novel, vertical garden apparatus and method wherein a planting medium is contained within a vertically oriented column, the vertical column being constructed from modular elements. Apertures in the sidewall of the column provide access for inserting seeds or the roots of plants into the planting medium. Alternatively, planting cups are provided and may be selectively and removably attached at the apertures. These optional, cup-shaped inserts are available for supporting the plants externally to the column of growth medium. A moisture sensor system provides for the automated watering of the plants. The water can be delivered either by pump from a basal reservoir or by gravity from an overhead reservoir.

It is, therefore, a primary object of this invention to provide improvements in vertical gardening apparatuses.

Another object of this invention is to provide improvements in the method of providing a vertical, planting medium support for plants.

Another object of this invention is to provide a vertical gardening system having a vertical column selectively assembled from modular elements.

Another object of this invention is to provide an automated watering system for plants in a vertical planter, the automated system including a moisture sensor to activate the automated watering system.

Another object of this invention is to provide a demountable cup-like projection for supporting plants on the vertical planter.

Another object of this invention is to provide a low water alarm to indicate when the water in the reservoir is low.

These and other objects and features of the present invention will become more readily apparent from the following description along with the accompanying drawing and the appended claims.

DETAILED DESCRIPTION OF THE PREFERRED EMBODIMENT

The invention is best understood from the following description and appended claims taken in conjunction with the accompanying drawing wherein like parts are designated by like numbers throughout.

GENEAL DISCUSSION

The novel vertical planter of this invention is configured as a vertical column constructed from one or more modular elements and having a plurality of planting apertures formed in the wall of the column. The planting apertures are generally oviform in shape having the long axis of the oviform aperture oriented parallel to the axis of the vertical column. The column is filled with a planting medium. A burlap or other suitable mesh liner holds the planting medium in place during shipment and use. The liner may be slit at the apertures to permit the insertion of a plant or seeds directly into the planting medium. Plants are grown directly through the apertures or, alternatively, planting cups are provided and are configured to be selectively and removably mounted in the apertures. The planting cups simplify the planting of seeds and plants at the apertures on the vertical column. When the planting cup is used it may be desirable to remove the liner from across the aperture to allow planting medium to flow into and fill the planting cup. Alternatively, additional planting medium may be placed into the planting cups. The vertical column is configured with an automated watering system designed to prevent the planting medium from drying out. An overhead reservoir provides a gravity feed for the water. Moisture sensors are inserted into the planting medium and are used to drive a pump mechanism to introduce additional water into the overhead reservoir. A low water level sensor provides an alarm signal when the water in the reservoir is low.

DETAILED DESCRIPTION

Figure 1:
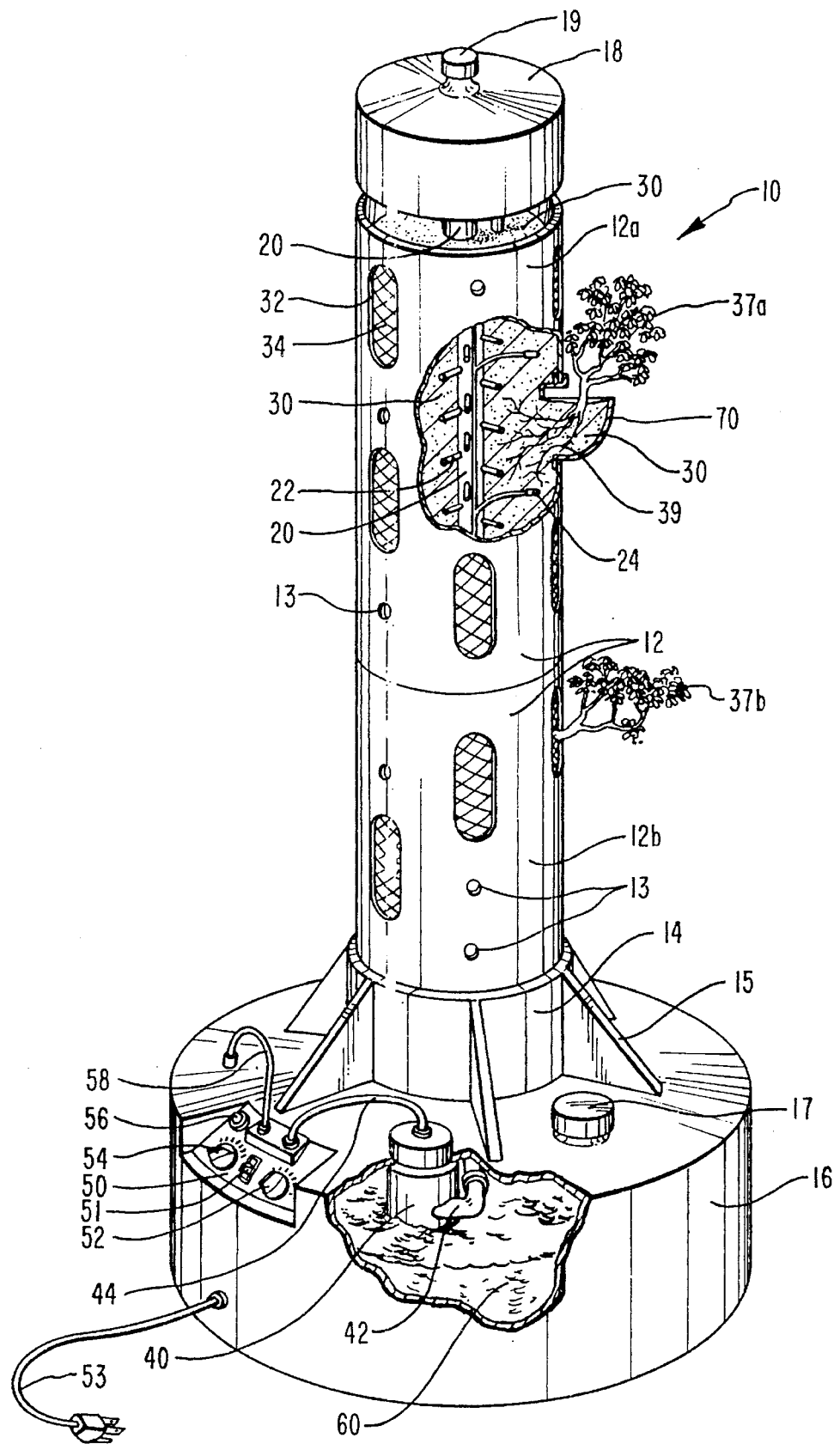
FIG. 1 is a perspective view of one presently preferred embodiment of the novel vertical planter of this invention shown with portions broken away from ease of illustration.

Referring now to FIG. 1, the novel vertical planter apparatus of this invention is shown generally at 10 and includes a vertical oriented column 12 mounted to a pedestal 14 on top of a lower reservoir 16. An upper reservoir 18 is mounted to the upper end of column 12 and is in fluid communication with the interior of column 12 through a standpipe 20. Column 12 is configured from two modular elements, column modules 12a and 12b, stacked vertically in an end-to-end relationship. This unique feature readily adapts vertical planter 10 to any preselected height while utilizing the novel column modules of this invention as represented by column modules 12a and 12b. As such, column 12 can be configured with only one column module, column module 12b, or may be configured with any suitable number of column modules.

Column 12 includes a plurality of aeration ports 13 and is filled with a planting medium 30, access to which is provided through planting ports 32. A mesh-like netting or burlap 34 holds planting medium 30 inside column 12 at each of planting ports 32. Planting ports 32 are shown herein as having a generally oval shape with the long axis of the oval shape being oriented parallel to the axis of column 12. A planter cup 70 is shown herein mounted to one of planting ports 32 and containing planting medium 30. Planter cup 70 includes a plant 37a growing therein with the roots 39 of plant 37a extending into both the planting medium 30 in planter cup 70 as well as planting medium 30 inside column 12. Each of planting ports 32 is capable of selectively receiving a planter cup 70 therein although only one planter cup 70 is shown herein for ease of illustration. Alternatively, a plant 37b can be planted directly through burlap 34 into planting medium 30 at each of planting ports 32. This is accomplished by cutting or otherwise forming an opening in burlap 34 and inserting the roots (not shown) of plant 37b directly into planting medium 30.

Lower reservoir 16 serves as a platform for pedestal 14 which is supported on lower reservoir 16 by a plurality of braces 15. Braces 15 serve to stabilize pedestal 14 and column 12 with respect to lower reservoir 16. Lower reservoir 16 is configured to hold a body of water 60 which is used both to water plants 37a and 37b and also act as a stabilizing weight in support of column 12. Water 60 is added to lower reservoir 16 through a filler cap 17 and is pumped by a pump 40 through a conduit 42. Conduit 42 carries water 60 upwardly through standpipe 20 into upper reservoir 18.

Lower reservoir 16 includes a control panel 50 having an on/off switch 51, a timer 52, a moisture controller 54, and a warning light 56 located thereon. On/off switch 51, as the name implies, is the switch for activating all of the electrical systems of vertical planter 10 by controlling the electrical power obtained through power cord 53. Timer 52 sets the length of time during which pump 40 is operated in order to pump water 60 from lower reservoir 16 into upper reservoir 18. The watering sequence of water 60 from upper reservoir 18 will be discussed more fully hereinafter. Moisture controller 54 is used to set the level of moisture to be maintained in planting medium 30. Warning light 56 provides an alarm condition when the level of water 60 in lower reservoir 16 falls below a preselected level. A lead 58 connects warning light 56 to a water level sensor (not shown) in lower reservoir 16. A power lead 44 provides electrical power to pump 40.

Figure 2:
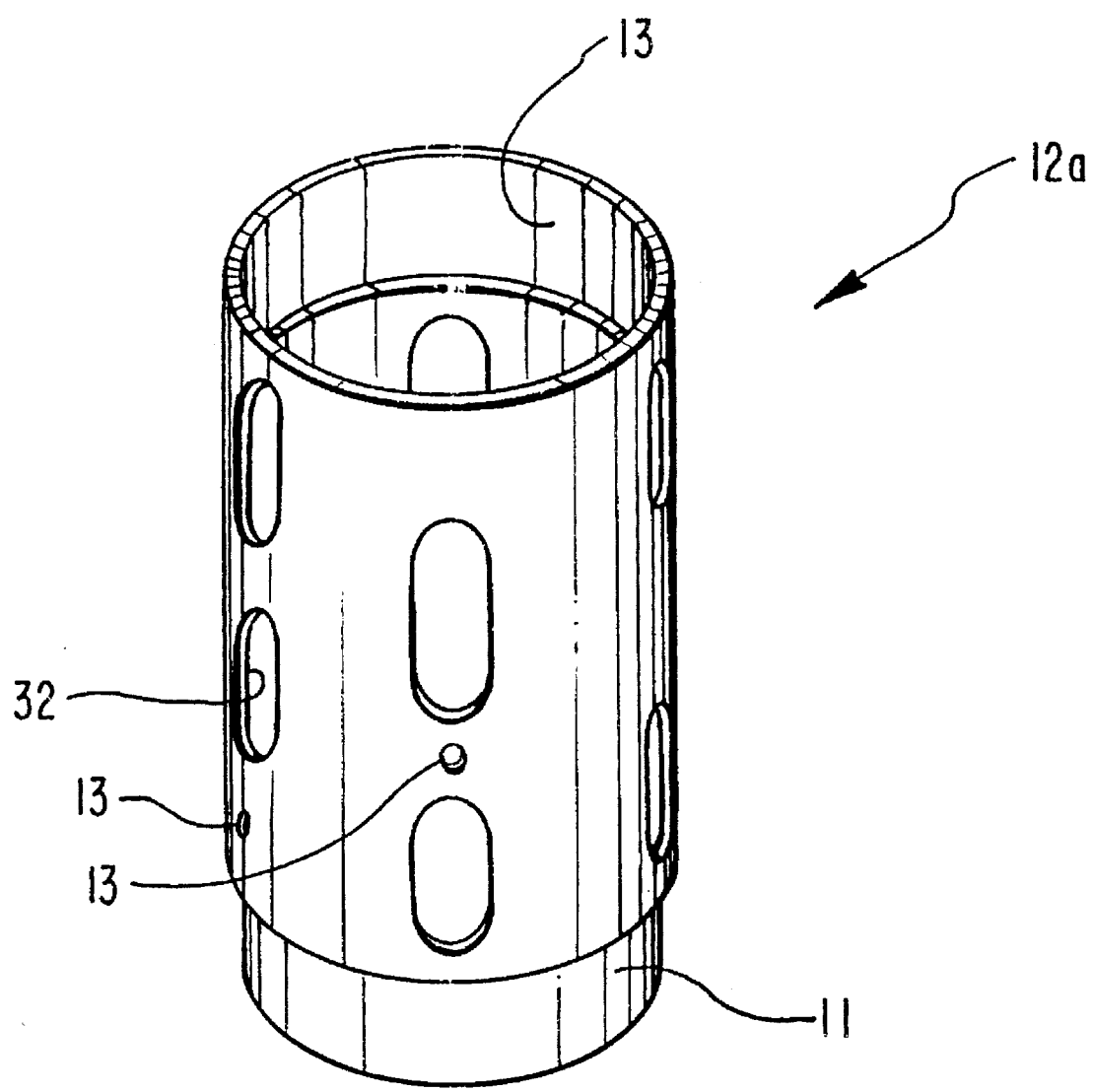
FIG. 2 is a perspective view of one of the modular elements of FIG. 1.

Referring now to FIG. 2, one of the column modules for column 12 (FIG. 1) is shown as column module 12a but removed from vertical planter 10 in order to illustrate more clearly the various features of column module 12a. Column module 12a includes the plurality of planting ports 32 but is shown herein in the absence of either mesh liner 34 or planting medium 30 (FIG. 1). Column module 12a includes at its lower end a circumferentially reduced coupling 11 and at its upper end a circumferential recess 13. The outer diameter of coupling 11 is coordinated with the inner diameter of recess 13 to provide a snug fit relationship for the purpose of providing column 12 with the necessary vertical stability. Coupling 11 is designed to be telescopically received in snug fit relationship in recess 13 of the adjoining column module identical to column module 12a. This relationship is seen in FIG. 1 wherein column module 12a is joined to column module 12b to form column 12. Advantageously, any suitable number of column modules 12a can be used in the assembly of column 12.

Figure 3:
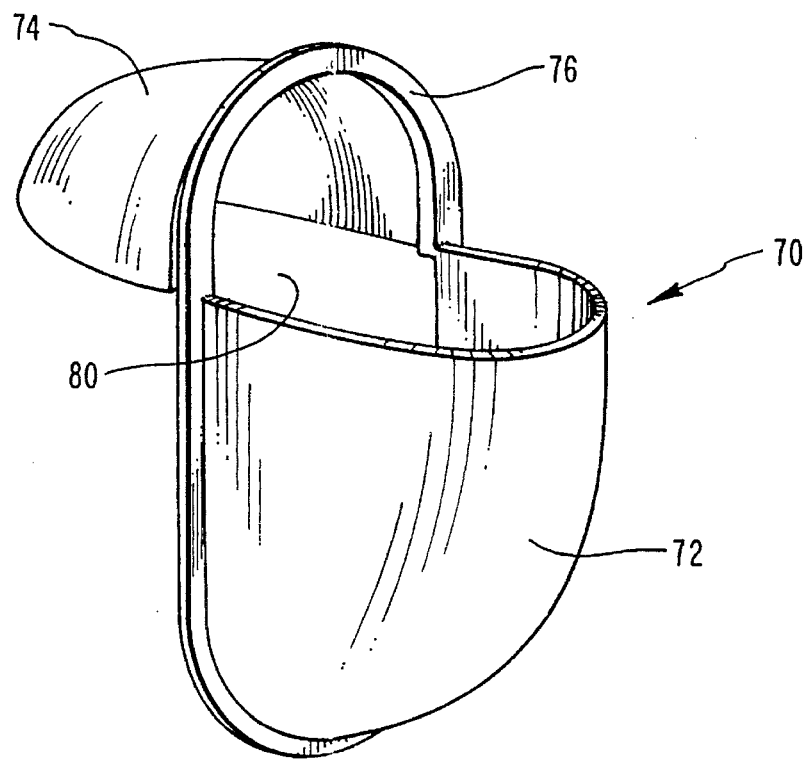
FIG. 3 is an enlarged perspective view of a planting cup.
Figure 4:
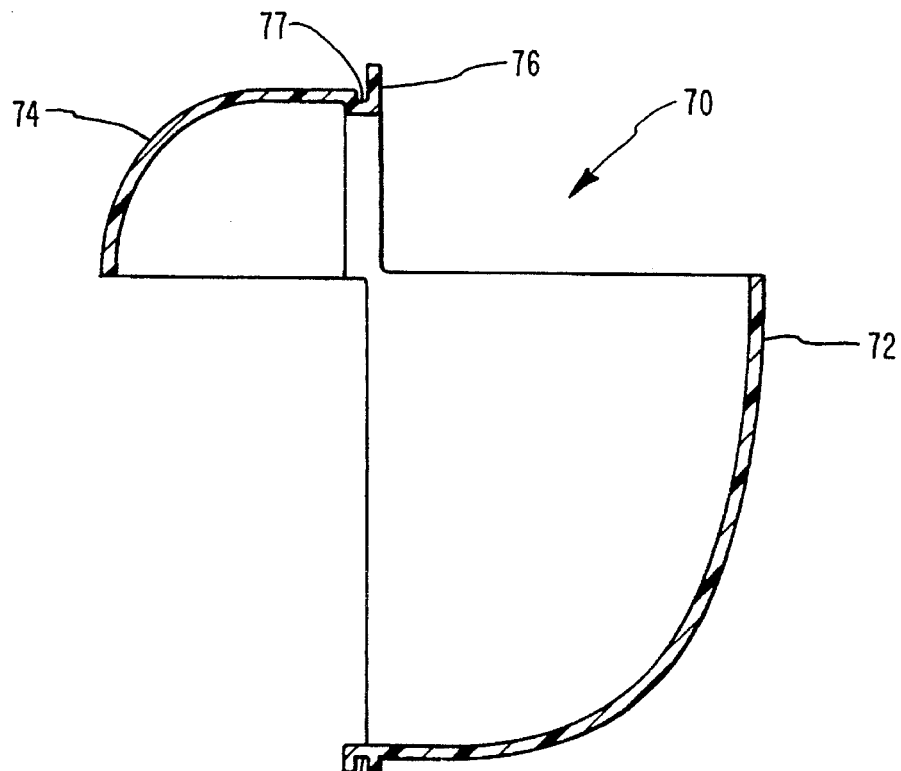
FIG. 4 is a cross-sectional view of the planting cup of FIG. 3 taken along lines 4—4 of FIG. 3.

Referring now to FIGS. 3 and 4, planter cup 70 is shown in greater detail having a plant holder 72, a shield 74 and a frame 76. An opening 80 is created between plant holder 72 and shield 74 as defined by frame 76 and provides the access port through which plant 37a (FIG. 1) has access to planting medium 30. Planter cup 70 is configured to receive planting medium 30 while shield 74 prevents excess planting medium 30 from inside column 12 from overflowing plant holder 72. Frame 76 includes an annular recess 77 which is designed to adapt planter cup 70 in a snap-fit relationship in port 32 (FIG. 1). In this way it is a simple procedure to assemble planter cup 70 into port 32 in a secure, leak proof relationship.

THE METHOD

The method of this invention is practiced by assembling one or more column modules 12a on pedestal 14 in order to produce column 12 of vertical planter 10. Water distribution system 20 is then assembled with outlets 22 along with moisture sensors 24 prior to planting medium 30 being loaded into column 12. Selectively, planter cups 70 may be installed in ports 32 or ports 32 may be simply lined with liner 34 which holds planting medium 30 inside column 12. Water 60 along with any desired, soluble nutrients is then introduced into lower reservoir 16. With the activation of pump 40, water 60 is directed into upper reservoir 18 where it is fed through water distribution system 20 and water outlets 22 into planting medium 30. Alternatively, water 60 may be poured through inlet 19 into upper reservoir 18 where it is also fed by gravity into planting medium 30 through water distribution system 20.

Vertical planter 10 is designed to create a visually pleasing column of plants 37a and 37b in each of planting ports 32 so that column 12 is, essentially, a "hanging" garden that can be moved from place to place as desired. In this manner, vertical planter 10 provides a centerpiece or, in combination with a plurality of vertical planters 10, a privacy screen, or the like. Advantageously, the automated watering system provided in vertical planter 10 allows it to be operated essentially hands free thereby providing to the gardener (not shown) a simple, yet effective, apparatus and method for the enjoyment of the activity of gardening. Importantly vertical planter 10 requires very little space and can be illuminated using artificial light in those circumstances where such lighting is either desired or required.

The modularity of vertical planter 10 allows it to be easily transported to its place of use such as an apartment in a high rise apartment building where it can then be assembled for use. The number of column modules 12a and 12b assembled into vertical planter 10 allows the gardener (not shown) to more easily carry it about while also providing a unique system for erecting vertical planter 10 to any preselected height. Transportability is provided through each of column modules 12a and 12b being of a suitable length and diameter to accommodate such portability. Removability of column module 12b from pedestal 14 also reduces the weight and overall bulk of lower reservoir 16. This is particularly important if the gardener (not shown) wants to carry vertical planter 10 into an elevator in order to reach an apartment in a high rise apartment building.

Once transported, vertical planter 10 is easily assembled by mounting column module 12b to pedestal 14 followed by mounting column module 12a to column module 12b along with any additional column modules mounted thereto in an end-to-end relationship to create vertical planter 10 with any suitable height. Standpipe 20 and its associated elements are also assembled in conjunction with the assembly of column modules 12a and 12b prior to column 12 being filled with planting medium 30. In this manner, vertical planter 10 assembled in its completed state and filled with both planting medium 30 and water 60 could easily weigh several hundred pounds whereas it has been easily transported and then assembled from components, each of which weigh substantially less than the completed unit of vertical planter 10.

After the planting season has concluded in an outdoor setting, vertical planter 10 can be winterized as it stands by draining water 60 therefrom or by disassembly into its various components and stored as individual components for subsequent reassembly for the next growing season. Either technique is easily accomplished with the novel vertical planter 10 of this invention. Alternatively, vertical planter 10 can be readily moved indoors to support the suitable varieties of plants 37a and 37b for growing in an indoor environment.

Uniquely, planter cup 70 readily adapts vertical planter 10 for supporting plants 37a that may benefit from a horizontal surface planting medium 30. Importantly, planter cup 30 snaps into place in planting ports 32 thereby adapting vertical planter 10 to any suitable variety of plants 37a and 37b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A vertical planter comprising:

a hollow column comprising at least two column modules, said column modules being mountable in an end-to-end relationship to form said hollow column;

an enclosed reservoir for holding a body of water;

mounting means on said enclosed reservoir for mounting said hollow column in a vertical orientation on said enclosed reservoir;

a planting medium in said hollow column;

a plurality of planting ports formed in said hollow column, said planting ports providing access for plants to be planted in said planting medium;

a plurality of planter inserts for mounting in said planting ports, each of said planter inserts comprising a frame generally conforming to the outline of said planter ports, a planter cup mounted to said frame and extending outwardly from said frame to hold a body of said planting medium on the outside surface of said hollow column when said planter insert is mounted to said planting port said planter insert including a shield mounted to said frame above said planter cup and extending inwardly into said hollow column when said planter insert is mounted to said planting port; and water distribution means for distributing water from said body of water to said planting medium for said plants, said water distribution means comprising a pump means for distributing said water, said water distribution means including moisture sensor means in said planting medium for sensing when said planting medium requires more water, said moisture sensor means activating said pump means to distribute said water to said planting medium.

2. The vertical planter defined in claim 1 wherein said mounting means comprises a pedestal for supporting said hollow column in said vertical orientation on said enclosed reservoir.

3. The vertical planter defined in claim 1 wherein said water distribution means includes a secondary reservoir on top of said hollow column.

4. A vertical planter comprising:

a hollow column;

an enclosed reservoir for holding a body of water;

mounting means on said enclosed reservoir for mounting said hollow column in a vertical orientation on said enclosed reservoir;

a planting medium in said hollow column;

a plurality of planting ports formed in said hollow column, said planting ports providing access for plants to be planted in said planting medium;

water distribution means for distributing water from said body of water to said planting medium for said plants; and a plurality of planter inserts for mounting in said planting ports, each of said planter inserts comprising a frame generally conforming to the outline of said planting port, a planter cup mounted to said frame and extending outwardly from said frame to hold a body of said planting medium on the outside surface of said hollow column when said planter insert is mounted to said planting port, said planter insert including a shield mounted to said frame above said planter cup and extending inwardly into said hollow column when said planter insert is mounted to said planting port, said shield preventing said planting medium from overflowing said planter cup.

5. A vertical planter comprising:

a water reservoir;

a first hollow column module;

a pedestal on the water reservoir for supporting said first hollow column module in a vertical orientation on said water reservoir to form a planting column from said first hollow column module;

a planting medium in said planting column;

a plurality of planting ports in said planting column, said planting ports providing access for plants to be planted in said planting medium;

a plurality of planter inserts selectively mounted in said planting ports, each of said planter inserts comprising a frame for engaging said planting ports, said frame supporting a planter cup across said planting port with said planter cup extending outwardly from said planting column, said planter insert including a shield on said frame, said shield extending inwardly into said planting column above said planter cup to restrict excess planting medium from overflowing said planter cup; and water distribution means for delivering water from said water reservoir to said planting medium.

6. The vertical planter defined in claim 5 wherein said planting column comprises a plurality of planting modules mounted in an end-to-end relationship on said pedestal.

7. The vertical planter defined in claim 5 wherein said planting column includes a plurality of planter inserts selectively mounted in said planting ports, each of said planter inserts comprising a framework for engaging said planting ports, said framework supporting a planter cup across said planting port with said planter cup extending outwardly from said planting column.

8. The vertical planter defined in claim 5 wherein said water distribution means comprises a distributor line in said planting column, said distributor line including a plurality of outlets for distributing said water into said planting medium.

9. A vertical planter comprising:

a water reservoir;

a first hollow column module;

a second column module mounted axially to said first column module to form a planting column;

a pedestal on the water reservoir for supporting said planting column in a vertical orientation on said water reservoir;

a planting medium in said planting column;

a plurality of planting ports in said planting column, said planting ports providing access for plants to be planted in said planting medium;

at least one planter cup mountable to one of said planting ports, said planter cup extending outwardly from said planting column, said planter cup including a frame and a shield mounted to said frame above said planter cup and extending inwardly into said planting column when said planter cup is mounted to said planting port and supporting a portion of said planting medium; and water distribution means for delivering water from said water reservoir to said planting medium, said water distribution means comprises a distributor line in said planting column, said distributor line including a plurality of outlets for distributing said water into said planting medium, said water distribution means including a pump for delivering water from said water reservoir to said distributor line and moisture sensor means in said planting medium for controlling said pump.

10. A method for growing plants in a vertical orientation comprising:

preparing a water reservoir for holding a body of water for the plants;

placing a pedestal on said water reservoir;

mounting a hollow column on said pedestal with the axis of said hollow column oriented vertically;

forming a plurality of planting ports in said hollow column;

inserting at least one planter cup in a planting port, said planter cup being configured to hold a portion of said planting medium externally on said hollow column, said planter cup including a frame and a shield mounted to said frame above said planter cup and extending inwardly into said hollow column when said planter cup is mounted to said planting port;

filling said hollow column and said planter cup with a planting medium;

planting the plants in said planting medium through said planting ports and in said planting medium in said planter cup;

placing a distributor line in said planting medium and distributing water from said water reservoir into said distributor line thereby delivering said water into said planting medium; and inserting a moisture sensor means in said planting medium, said moisture sensor means activating said distributor line in said planting medium thereby controlling watering the plants with said water from said water reservoir.

* * * * *